UNITED STATES PATENT OFFICE.

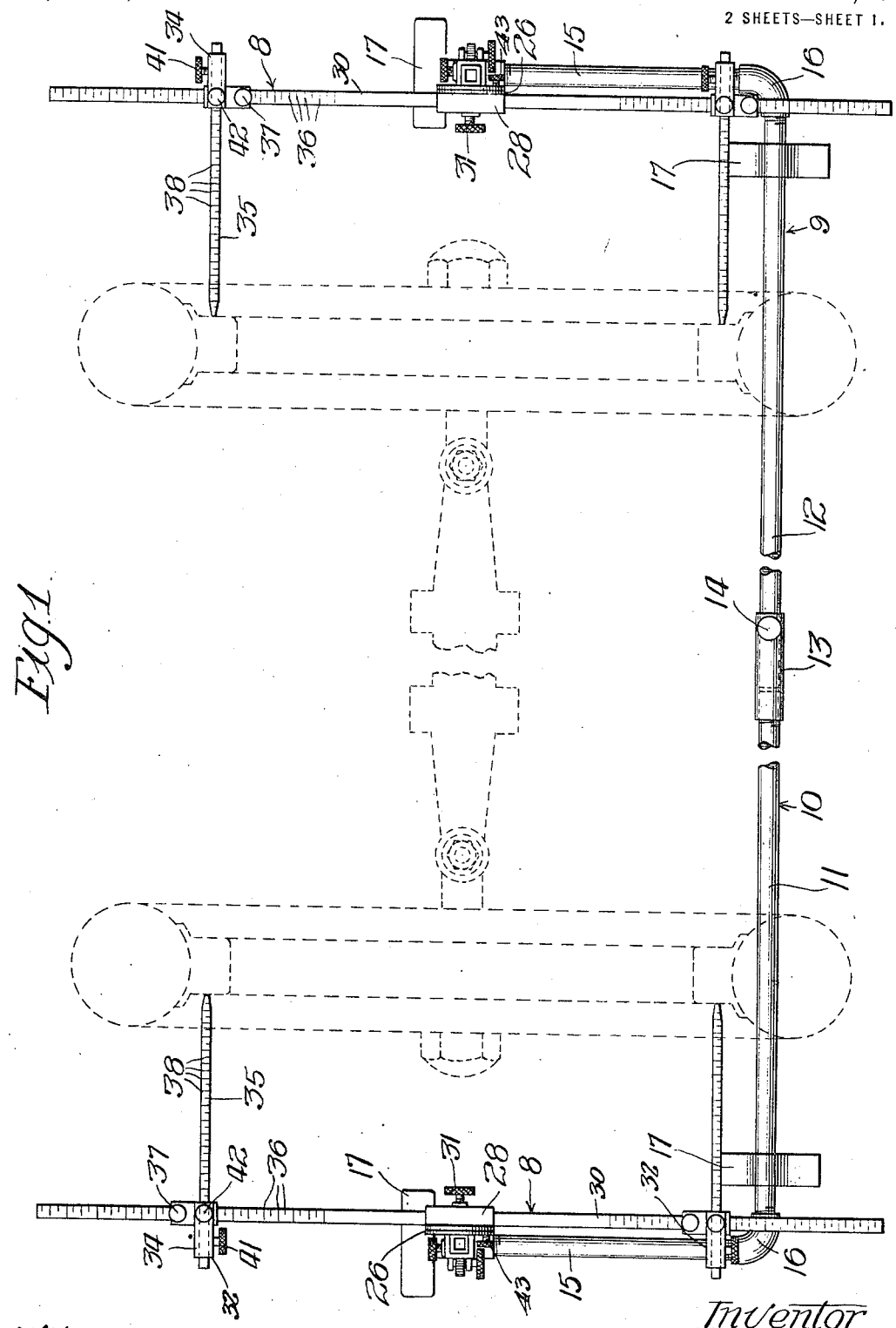

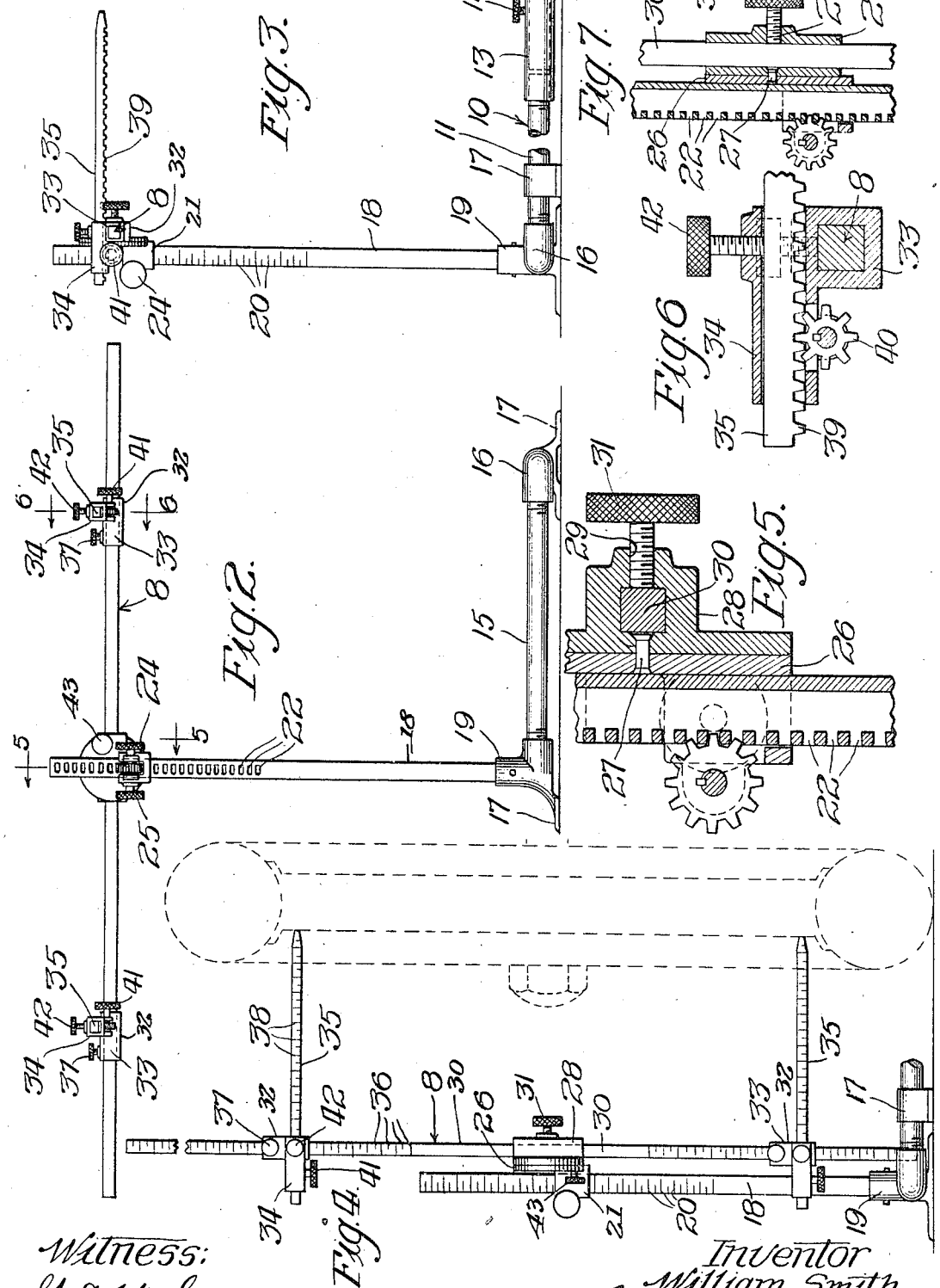

WILLIAM SMITH, OF CHICAGO, ILLINOIS.

DEVICE FOR DETERMINING THE TRUENESS OF WHEELS.

1,209,345. Specification of Letters Patent. Patented Dec. 19, 1916.

Application filed October 7, 1915. Serial No. 54,548.

*To all whom it may concern:*

Be it known that I, WILLIAM SMITH, a citizen of the United States, residing at Chicago, in the county of Cook and State of Illinois, have invented certain new and useful Improvements in Devices for Determining the Trueness of Wheels, of which the following is a specification.

The present invention relates to a device or appliance for determining the trueness of rotation of vehicle wheels.

The objects of the present invention are to produce a device in which measurers or detectors will be supplied that can be placed against the wheel at each side of the axial center of the wheel; to provide means for shifting these measurers or detectors about a pivotal center so as to test the alinement at different portions of the wheel; to provide means for raising or lowering the detectors a proper distance from the ground line to position them at the axle of the wheel; and to so arrange the parts as to make the device simple and easy of application and removal, and to allow of the application of the indicating means to various portions of the wheel rim without difficulty or confusion.

The invention further consists in the features of construction and combinations of parts hereinafter described and claimed.

In the drawings: Figure 1 is a plan view of the device of the present invention shown as applied to the front running gear of an automobile; Fig. 2 is a side view of said appliance; Fig. 3 is a front view of one end of said appliance; Fig. 4 is a view, showing the indicating or measuring portion of the appliance turned into approximate right angled position from that shown in Figs. 1 and 2; Fig. 5 is a section on line 5—5 of Fig. 2, looking in the direction of the arrow; Fig. 6 is a section on line 6—6 of Fig. 2, looking in the direction of the arrow; and Fig. 7 is a detail section, similar to Fig. 5, but showing the bar 30 turned at right angles from the position shown in Fig. 5.

In the use of automobiles, it has been found that excessive wear of tires, as well as difficulty in steering, has frequently occurred by reason of the wheels, particularly the front wheels, of the car being out of true and not traveling in the correct circular path about their axial center. This defect is, in most cases, not visible to the eye, and is, therefore, not corrected until after damage has been done to the tires. The device of the present invention is in the nature of a detector for determining, whenever the user may desire, the trueness of such wheels.

Referring now to the drawings, the entire device may be said to consist of two parts, a carrier for the measuring or detecting implements designated by the general numeral 8, and a support for this carrier designated by the general numeral 9. The support in the construction shown consists of a front rail 10 which, as shown, is of tubular formation, and is formed of two members 11 and 12 joined together by a coupling member 13. The tube 11 may be affixed to the coupling member, while the tube 12 may be slidable in and out of said member, and is held in adjusted position within the coupling member by a set-screw 14. This is to permit of a lengthening or contracting of the supporting member. The supporting member further consists of rearwardly extending rails or rods 15, which are joined to the front rails or rods by suitable couplings 16. Suitable rests or supports 17 are provided which are placed upon the ground.

Extending upwardly from adjacent the rear of the rails 15 is a vertical post 18 maintained in fixed relation to the rail 15 by a suitable coupling 19. This post is provided with a graduated surface 20, and movable longitudinally of this post is a sleeve 21. Rack teeth 22 are formed on one side of the post, and a pinion 23 is mounted on the sleeve 21 adapted to mesh with the rack teeth 22. The opinion is operated by a suitable finger piece 24. As will be readily understood by a turning of this finger piece, the pinion will be rotated and will engage the rack teeth 22, whereby the sleeve 21 will be moved in a vertical direction and longitudinally of the post 18. It is understood that there is a similar attachment supplied for each of the rails 15.

In order to lock this sleeve 21 in its desired elevated position, a set-screw 25 is provided. The sleeve 21 has fixedly connected thereto, or formed integral therewith, a disk-like portion 26, as shown in Fig. 7. Connected to this disk-like portion 26 by a suitable connecting member 27 is a sleeve 28, said connection, as will be apparent from Fig. 7, is of a nature which does not permit of any relative sliding movement between the sleeves 21 and 28, but does permit of a rotative movement, the function of which will be hereinafter set forth.

The sleeve 28 serves as a mounting or bearing for a bar 30 which is the mounting for the measuring instruments. This bar is adapted to slide through the sleeve, and is held in adjusted position by means of a set screw 31 extending in the threaded opening 29. Mounted to slide upon the bar 30 are two carriers 32 each similar in formation. These carriers are each provided with a sleeve 33, through which the bar 30 passes, and with a sleeve 34, through which a detecting or measuring implement 35 extends. The bar 30 at each end is provided with a scale surface 36, and a set-screw 37 is provided for locking the sleeve 33 to the bar 30. The measuring or detecting members 35 are in the form of a pointed rod or bar with a sealed surface 38 thereon.

On the under face of each of said members is a rack 39 with which meshes a pinion 40, as shown in Fig. 6, said pinion being carried by the sleeve 34, and the pinion is turned by manipulation of a suitable finger piece 41. It is thus apparent that these measuring or detecting members can be moved in and out as desired, and for locking them in place, a set-screw 42 is provided.

It is understood that there are two of the above described carrying means for the detecting or measuring members employed, one on each side of the device. As will be seen from Fig. 1, there are four measurers or detectors employed, two for each wheel, and the method of mounting or adjusting all of these measurers, or detectors, is the same in each instance, the previous description for the sake of clearness having been confined to one of the carrying and adjusting means only, and to one of the detecting implements.

It is frequently desirable to obtain measurements at different points upon the face of the wheel rim, and in order to obtain this the pivotal connection between the sleeves 28 and 21 is employed. In the position shown in Fig. 1, the detecting or measuring members are placed at points lying horizontally opposite one another, while in the position shown in Fig. 4, they are placed at points lying vertically opposite, or approximately vertically opposite to one another, and to shift the detectors from vertical to horizontal position and to positions intermediate the two named, the pivotal connection between the sleeve 28 and 21 is provided.

In order to effect this turning, a set-screw 43 is first loosened. This set-screw passes through the disk-like portion 26, bears against the body of the sleeve 28, and thus locks the two sleeves together. When the set-screw has been withdrawn from engagement with the sleeve 28, said sleeve can then be turned about the pivotal member 27 as a center and moved into any desired adjusted position, after which the set-screw 43 is again moved into locking position and a measurement taken. The measurement is obtained by first positioning the sleeve 21 upon the post 18 at the desired height, then moving the sleeves 32 outwardly along the rod 30 to the desired distance from the axial center of the wheel. The detectors or measuring members 35 are then moved until the points thereof are a distance from the bar 30, which would be the correct distance that the rims of the wheels should be from said bar if the wheels are true. If the points of the detectors do not engage said rim when they are so adjusted, it is an indication that the wheels are out of true and a correction should be made. By turning the bar 30, the measurement can be taken at various portions of the wheel rim, and, therefore, in a single operation a very accurate and efficient test as to the trueness of the wheel can be effected.

As shown in the drawings, the carriers 8 extend parallel to one another and at right angles to the front rail 10, and this is the correct position for truing either the front or back wheels. But when it is desired to true one front and one back wheel on the same side of the machine, then the carriers 8 are turned parallel to each other and parallel to the front rail 10, and the device placed along the side of the machine. Thus, by the present appliance, the front wheels may be trued, the rear wheels trued, and each front and rear wheel on the same side of the machine trued with respect to each other.

I claim:

1. In a device of the class described, the combination of a supporting member, detector members, a mounting for the detector members carried by the supporting member, said detector members being adjustable on said mounting both longitudinally of the mounting and longitudinally of themselves and with straight line movements, and said detector members being arranged on said mounting to lie upon opposite sides of the axle of a wheel, substantially as described.

2. In a device of the class described, the combination of a supporting member, detector members, a mounting for the detector members adjustable upon the supporting member, means for permitting adjustment of said detector members on their mounting, both longitudinally of the mounting and longitudinally of themselves and with straight line movements and said members being arranged to lie upon opposite sides of the axle of a wheel, substantially as described.

3. In a device of the class described, the combination of a supporting member, detector members, a mounting for said detector members at each end of the supporting member, means for permitting vertical adjustment of said mounting upon the supporting member, means for permitting adjustment of said mounting in a direction longitudinally of itself, means for permitting adjustment of said detectors along the mounting, and means for permitting adjustment of the members in a direction longitudinally of themselves, substantially as described.

4. In a device of the class described, the combination of a supporting member, detector members, a mounting for said detector members at each end of the supporting member, means for permitting vertical adjustment of said mounting upon the supporting member, means for permitting adjustment of said mounting in a direction longitudinally of itself, means for permitting adjustment of said detectors along the mounting, means for permitting adjustment of the members in a direction longitudinally of themselves, and to permit turning of said mounting about a pivotal center, substantially as described.

5. In a device of the class described, the combination of a supporting frame-work, a vertical bar secured to said frame-work, a sleeve vertically adjustable on said bar, a second sleeve pivotally secured to the first mentioned sleeve, detector members, a mounting for the detector members carried by the second sleeve, and on which mounting the detector members are adjustable, means for permitting adjustment of said mounting longitudinally of itself through said sleeve, and means for locking said second sleeve against rotative movement about its pivotal connection with the first mentioned sleeve, substantially as described.

6. In a device of the class described, the combination of a supporting member, companion detector members, a mounting for the detector members at each end of the supporting members, said detector members being adjustable on the mounting both longitudinally of the mounting and longitudinally of themselves and with straight-line movements, and the members upon each mounting being arranged to lie upon opposite sides of the axle of a wheel, and a pivotal support for the mounting permitting the turning of the mounting and detector members about a center, substantially as described.

7. In a device of the class described, the combination of a supporting member, detector members, a mounting for the detector members carried by the supporting member and adjustable thereon, said detector members being adjustable on said mounting both longitudinally of themselves and longitudinally of the mounting with straight-line movements, and a pivotal support for the mounting permitting a turning of the mounting and detector members about a center, substantially as described.

WILLIAM SMITH.

Witnesses:
 Wm. P. Bond,
 Amy Jehle.